US008613109B2

(12) United States Patent
Janoulis et al.

(10) Patent No.: US 8,613,109 B2
(45) Date of Patent: Dec. 17, 2013

(54) METHOD AND APPARATUS FOR PROVIDING MOBILE SOCIAL NETWORKING PRIVACY

(75) Inventors: Jeanne Nicole Janoulis, Atlanta, GA (US); Jay D. Rector, Loganville, GA (US); Marcel Theodore Rivard, Woodinville, WA (US); David Hilliard Williams, Redmond, WA (US); David E. Wrobleski, Roswell, GA (US); Quetia Arzu, Kennesaw, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 642 days.

(21) Appl. No.: 12/630,641

(22) Filed: Dec. 3, 2009

(65) Prior Publication Data

US 2011/0138480 A1   Jun. 9, 2011

(51) Int. Cl.
 *H04L 29/06* (2006.01)
(52) U.S. Cl.
 USPC .......................................................... 726/29
(58) Field of Classification Search
 USPC .......................................................... 726/29
 See application file for complete search history.

(56) References Cited

U.S. PATENT DOCUMENTS

| 7,503,074 B2* | 3/2009 | Dublish et al. ................... 726/27 |
| 2005/0255866 A1* | 11/2005 | Dupuy et al. ............. 455/456.6 |
| 2007/0150918 A1* | 6/2007 | Carpenter et al. .............. 725/25 |
| 2007/0281689 A1* | 12/2007 | Altman et al. ............. 455/435.1 |
| 2008/0070593 A1* | 3/2008 | Altman et al. ............... 455/457 |
| 2008/0274716 A1* | 11/2008 | Fok et al. ....................... 455/410 |
| 2009/0047972 A1* | 2/2009 | Neeraj ........................ 455/456.1 |
| 2009/0213001 A1* | 8/2009 | Appelman et al. ........ 342/357.07 |
| 2010/0036779 A1* | 2/2010 | Sadeh-Koniecpol et al. ... 706/11 |
| 2010/0110105 A1* | 5/2010 | Kinnunen et al. ............. 345/629 |

* cited by examiner

*Primary Examiner* — Michael S McNally

(57) ABSTRACT

A method, computer readable medium and apparatus for providing mobile social networking privacy are disclosed. For example, the method receives a request from a third party application for location information of a mobile endpoint device user, determines whether the third party application is a multiple user application and provides the location information of the mobile endpoint device user to the third party application in accordance with a privacy setting pre-defined by an authorized user if the third party application is a multiple user application.

20 Claims, 3 Drawing Sheets

METHOD AND APPARATUS FOR PROVIDING MOBILE SOCIAL NETWORKING PRIVACY

BACKGROUND

As social networking becomes more popular, various third party applications allow users of mobile endpoint devices to share their location information with other users. For example, the location of the user may be determined from a mobile endpoint device. Typically, the user does not need to do anything to provide their location via the mobile endpoint device. In some cases, the user may not even know that their location is being published or tracked via their mobile endpoint device.

This may raise a concern for parents who have children that typically sign up for social networking applications and those applications that provide or track their location via their mobile endpoint device. Parents may not want to allow their children's location information to be available to anyone in the public. As a result, privacy concerns exist with these types of applications.

SUMMARY

In one embodiment, the present disclosure discloses a method, computer readable medium and apparatus for providing mobile social networking privacy are disclosed. For example, the method receives a request from a third party application for location information of a mobile endpoint device user, determines whether the third party application is a multiple user application and provides the location information of the mobile endpoint device user to the third party application in accordance with a privacy setting pre-defined by an authorized user if the third party application is a multiple user application.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
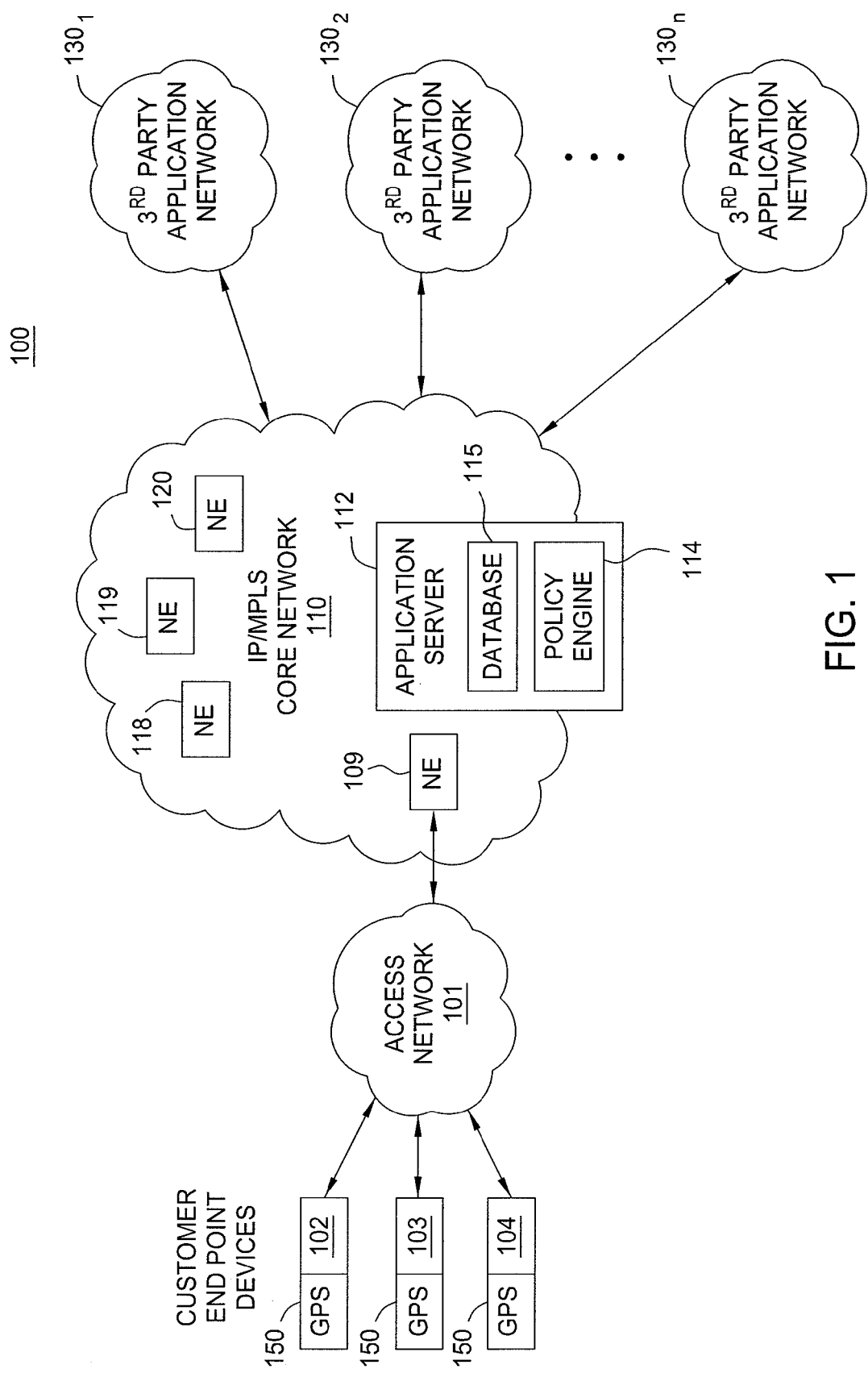
FIG. 1 illustrates an exemplary network related to the present disclosure.

The present disclosure broadly discloses a method and apparatus for providing mobile social networking privacy. FIG. 1 is a block diagram depicting an exemplary network 100 related to the current disclosure. Exemplary networks include cellular networks, internet protocol networks, packet networks, and the like.

In one embodiment, the network 100 comprises a plurality of endpoint devices 102-104 configured for communication with the core packet network 110 (e.g., an IP based core backbone network supported by a service provider) via an access network 101. The network element 109 may serve as a gateway server or an edge router for the network 110.

The endpoint devices 102-104 comprise mobile customer endpoint devices such as laptop computers, Personal Digital Assistants (PDAs), mobile telephones, cellular telephones, mobile messaging devices, and the like. The access network 101 serves as a means to establish a wireless connection between the endpoint devices 102-104 and the NE 109 of the IP/MPLS core network 110. The access network 101 may comprise a cellular network, a Wireless Access Network (WAN), and the like. The access network 101 may be either directly connected to NE 109 of the IP/MPLS core network 110, or indirectly through another network.

Some NEs (e.g., NEs 109) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a honeypot, a router, or like device.

In one embodiment, the IP/MPLS core network 110 also comprises an application server 112 that contains a policy engine 114 and a database 115. The application server 112 executes software that provides mobile social networking privacy, as discussed below.

The application server 112 may comprise any server or computer that is well known in the art, and the database 115 may be any type of electronic collection of data that is also well known in the art. The policy engine 114 may also contain a computer readable medium or memory for storing pre-defined privacy settings, as discussed below.

The above network 100 is described to provide an illustrative environment in which packets for voice and data services are transmitted on networks. Those skilled in the art will realize that although only three endpoint devices 102-104, one access network 101, and so on are depicted in FIG. 1, the communication system 100 may be expanded by including additional endpoint devices, access networks, border elements, etc. without altering the present disclosure.

In one embodiment, the network 100 can determine a subscriber's location. For example, the network 100 can determine the subscriber's location via a global positioning satellite (GPS) transmitter 150 coupled to the endpoint devices 102-104. The GPS information may be used for an assisted GPS (A-GPS) application. Alternatively, the network 100 can determine the subscriber's location without GPS using methods such as cell identification (cell ID), enhanced cell ID and the like.

The subscribers of the endpoint devices 102-104 may sign up for third party applications that use location information. The use of the location information can be categorized as either a single user application or a multi-user application. The single user application is for applications that allow the end user to use their own location information. For example, the end user may want to use their current location to find a nearby coffee shop or movie theater. The single user applications may be considered a type of "concierge" service.

The multi-user application allows other users to see the end user's location. Third party applications such as Loopt® allow users to track the location of other users via their mobile endpoint devices. For example, third party applications in the third party application networks $130_1$-$130_n$ may ask the IP/MPLS core network 110 for a location of a mobile endpoint device user, e.g., endpoint device 102. More specifically, a server in the third party application networks $130_1$-$130_n$ contacts the application server 112 in the IP/MPLS core network 110 asking for the location of the mobile endpoint device user associated with the endpoint device 102. The multiple user applications may be considered a type of "tracking" service.

However, such applications create privacy concerns. For example, parents may not want their children to freely publish their location information. As a result, parents may want the ability to control who has access to the location information of their children. As a result, single user applications and multi-user applications require different privacy levels. The present disclosure provides a solution to this problem by applying different privacy settings or levels for single user applications and multi-user applications.

In one embodiment, a mobile endpoint device may have privacy settings for single user applications defined by the end user of the mobile endpoint device. Generally, the privacy concerns are minimal as the end user is using their own location information for their own purpose in single user applications. In contrast, a mobile endpoint device may have privacy settings for multiple user applications defined by an authorized user that is someone other than the end user of the mobile endpoint device. This is because the privacy concerns are greater for multiple user applications where the end user's location is being shared with or used by other users or requestors.

In one embodiment, the authorized user may be an account holder or anyone delegated as an authorized user by the account holder. The account holder may be someone who pays for multiple endpoint devices on a single account. For example, within the single account, four different endpoint devices may be associated with the account. One endpoint device for each parent and one endpoint device associated with child 1 and child 2. As a result, one of the parents may be the account holder and, thereby, be the authorized user. The parent that is the authorized user may then delegate the other parent as another authorized user.

The account holder can also delegate people not on the account as an authorized user. For example, the account holder may want a grandparent or other relative to also have control over their children's privacy settings associated with multiple user applications. As such, the grandparent or other relative may also be delegated an authorized user status. Consequently, as the authorized user, either parent may modify and control the privacy settings associated with multiple user applications for their children's mobile endpoint devices.

The authorized user can pre-define privacy settings stored in the policy engine 114. The authorized user configures the privacy settings via a graphical user interface. For example, the authorized user may log in via a website to change or modify the privacy settings.

The privacy settings for various applications may be set on a per application basis. In one embodiment, the application server 112 may contain a location based services (LBS) catalog. The LBS catalog may contain various LBS offers that may be classified as a single user application, a multiple user application or both. Depending on the type of application, different privacy settings controlled by different users may be applied. For example, single user applications may have the privacy settings defined by the end user. In contrast, any application being classified as a multiple user application or both a single user and multiple user application may have the privacy settings defined by an authorized user.

In the case of multiple user applications, the authorized user can configure the privacy settings on various levels of granularity. At a highest level, the authorized user can globally grant or deny all requests for a location of any one of the mobile endpoint devices on an account for all multiple user applications. For example, the authorized user may not want anyone to be able to obtain a location of any of the mobile endpoint devices on the account. Similarly, the authorized user may want to allow anyone to obtain a location of any of the mobile endpoint devices on the account.

At another level, the authorized user may set the privacy settings on a per application basis. For example, the authorized user may deny some third party applications from obtaining a location of any one of the mobile endpoint devices on the account and the authorized user may grant some third party applications from obtaining a location of any one of the mobile endpoint devices on the account. Moreover, the authorized user may specify which mobile endpoint device's location each one of the third party applications may have access to. For example, the authorized user may specify that a first third party application may have access to a location of only mobile endpoints 102 and 103; a second third party application may have access to a location of only mobile endpoints 102 and 104, and so forth.

At another level, the authorized user may configure the privacy settings on a per user or requestor basis for multiple user applications. For example, the authorized user may pre-define a list of users (e.g., via a phone number, caller ID name, device ID, etc.) that has access to a location of each of the mobile endpoint devices on the account. In other words, if a requestor from the third party application is not on the list, then the request may be denied. Alternatively, the authorized user may pre-define a list of requestors to block. In other words, anyone on the list is blocked and anyone not on the list may obtain a location of any one of the mobile endpoint devices on the account.

In one embodiment, the authorized user can define which mobile endpoints each requestor may have access to for a location for multiple user applications. For example, the authorized user may configure that requestor A from a first third party application may only have access to a location of mobile endpoint device 102. In other words, a parent may want to allow a coach to track only one of their children via their mobile endpoint device.

At another level, the authorized user can configure the privacy settings based upon time or a date for multiple user applications. For example, the authorized user can associate a time and/or date range for each level of configuration, e.g., grant all requests between 8:00 am and 4:00 pm, deny a first third party application between 9:00 pm and midnight, allow requestor A to have access to a location of mobile endpoint device 1, from 8:00 am to 4:00 pm between Sep. 1, 2009 to Jun. 1, 2010.

At another level, the authorized user can configure the privacy settings based upon a location of the user of the mobile endpoint device for multiple user applications. For example, the authorized user may not want anyone to bother their children when they are at the library studying. As a result, the authorized user may configure the privacy setting based upon a location such that when the mobile endpoint devices of their children are at the library no one may have access to their location information. As a result, their friends cannot find them and interrupt their studying.

Location may also include a location range. For example, the authorized user may configure the privacy setting such that location information of a subscriber's mobile endpoint device cannot be provided when the requestor using the third party application is within a range (e.g., 500 feet, one mile, etc.). It should be noted that any combination of levels of granularity may be used to configure the privacy settings. For example, the authorized user may only define the privacy setting based upon a time or may define the privacy setting based upon the third party application, the requestor, the time and date and the location.

The authorized user may also set various parameters associated with the privacy settings of multiple user applications. For example, the authorized user may set a location resolution. In other words, the authorized user may define a range of location of a mobile endpoint device that is to be provided. For example, the authorized user can specify the location information to be provided within a one mile range. Alternatively, the authorized user can specify the location information to be provided in an exact location (e.g., an address, an intersection or a specific building, etc.). Moreover, the authorized user may configure a different location range for each third party application, user or requestor defined in the privacy settings.

Another parameter is notification. In other words, the authorized user may want to be notified when a mobile endpoint device on the account signs up for a third party application that is categorized as a multiple user application. As a result, the authorized user may set the privacy settings for the third party application accordingly. For example, if a child signs up for a tracking application via their endpoint device, the network may send a notification to the parent who is an authorized user. The parent, as an authorized user, may not trust the tracking application and configure the privacy setting such that the tracking application is denied location information for their child's mobile endpoint device. Alternatively, the parent may receive a notification that the other parent has also signed up for the tracking application and only allow the tracking application to obtain the location information for their child's mobile endpoint device if the request originates from the other parent, and so forth. Thus, the notifications may help inform the authorized user for properly configuring the privacy settings.

The pre-defined privacy settings discussed above is one parameter used to determine whether or not a third party application's request for a location of a mobile device is granted or denied. As discussed below with reference to FIG. 2, the network also authenticates the third party application and makes sure that the subscriber is signed up for a service to provide their location information.

Figure 2:
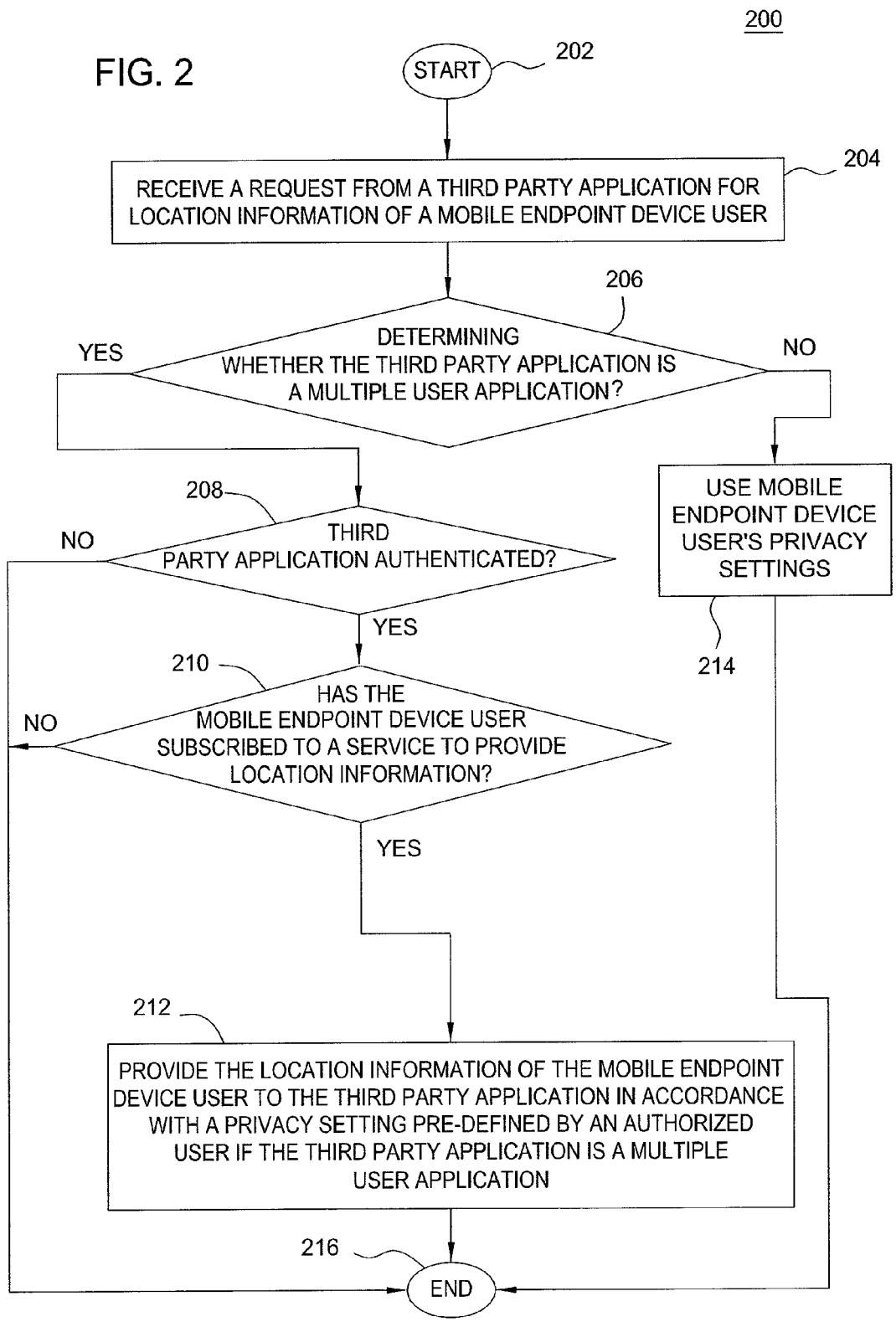
FIG. 2 illustrates a flowchart of a method for providing mobile social networking privacy.

FIG. 2 illustrates a flowchart of a method 200 for providing mobile social networking privacy. In one embodiment, the method 200 may be executed by the application server 112 or a general purpose computer as described below. Method 200 starts in step 202 and proceeds to step 204. The method 200 assumes that all the pre-processing or initialization steps are already performed. For example, the method 200 assumes that an authorized user has pre-defined privacy settings for multiple user applications that are stored in a policy engine and that one or more subscriber's associated with one or more respective mobile endpoint devices associated with an account of the authorized user are signed up for a service to provide location information with the communication network.

In step 204, the method 200 receives a request from a third party application for a location of a mobile endpoint device user. For example, a user of a third party application, such as Loopt®, may send a request to find a location of a mobile endpoint device user that is subscribed to communication services on the network 110.

In step 206, the method 200 determines whether the third party application is a multiple user application. As discussed above, an LBS catalog may categorize various third party applications into different categories, e.g., a single user application, a multiple user application or a single user and a multiple user application. Depending on the type of third party application, a different privacy setting may be applied as to whether or not the location information of the mobile endpoint device user is provided to the third party application.

If the third party application is not a multiple user application (i.e., the third party application is a single user application), the method 200 proceeds to step 214 where a privacy setting defined by the mobile endpoint device user is used. Presumably, the mobile endpoint user will allow their location information to be used for single user applications. As noted above, single user applications allow a mobile endpoint device user to use their own location information to find a particular nearby establishment or for personal navigation purposes, and the like. The method 200 proceeds to step 216 and ends.

However, if the third party application is a multiple user application, the method 200 proceeds to step 208. At step 208, the method 200 determines if the third party application is authenticated. For example, the communication network may only provide location information to trusted third party applications. In one embodiment, the third party application identifies itself to the communication network and then the network may authenticate the third party application based upon the identification. For example, the network may determine whether a digital certificate exists for the identified third party application. It should be noted that other methods of authentication may be used for authenticating the third party application.

This prevents any third party application from coming into the network to obtain a location of a mobile endpoint device user. As a result, a network may deny untrusted third party applications from obtaining location information of the mobile endpoint device user even if the mobile endpoint device user wants to allow the untrusted third party application to obtain their location information.

In addition, authentication includes providing a secure connection between the communication network and the third party application network. This ensures that location information is transferred in a secure environment.

If the third party application is not authenticated, then the method 200 immediately ends and proceeds to step 216. If the third party application is authenticated, the method 200 proceeds to step 210.

In step 210, the method 200 determines if the mobile endpoint device user is subscribed to a service to provide location information. In other words, the mobile endpoint device user must be provisioned for the service to provide location information to the authenticated third party application. If the mobile endpoint device user has not subscribed to the service, then the method 200 immediately ends and proceeds to step 216. If the mobile endpoint device user has subscribed to the service, then the method 200 proceeds to step 212.

In step 212, the method 200 provides the location information of the mobile endpoint device user to the third party application in accordance with a privacy setting pre-defined by an authorized user if the third party application is a multiple user application. As discussed above, multiple user applications create a greater privacy concern than single user applications. As a result, an authorized user can pre-define the privacy settings for multiple user applications. Notably, the authorized user is not the mobile endpoint device user and can override any settings for the multiple user application set by the mobile endpoint device user. The authorized user may configure various parameters of the privacy setting for multiple user applications, as discussed above.

In one embodiment, the location information is dynamically retrieved. That is, if the third party application is authorized to receive the location of the subscriber, the network may obtain the subscriber's location via a GPS transmitter 150 coupled to the mobile endpoint device. The GPS information may be used for A-GPS applications. Alternatively, the network 100 can determine the subscriber's location without GPS using methods such as cell ID, enhanced cell ID and the like. The method 200 ends at step 216.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Figure 3:
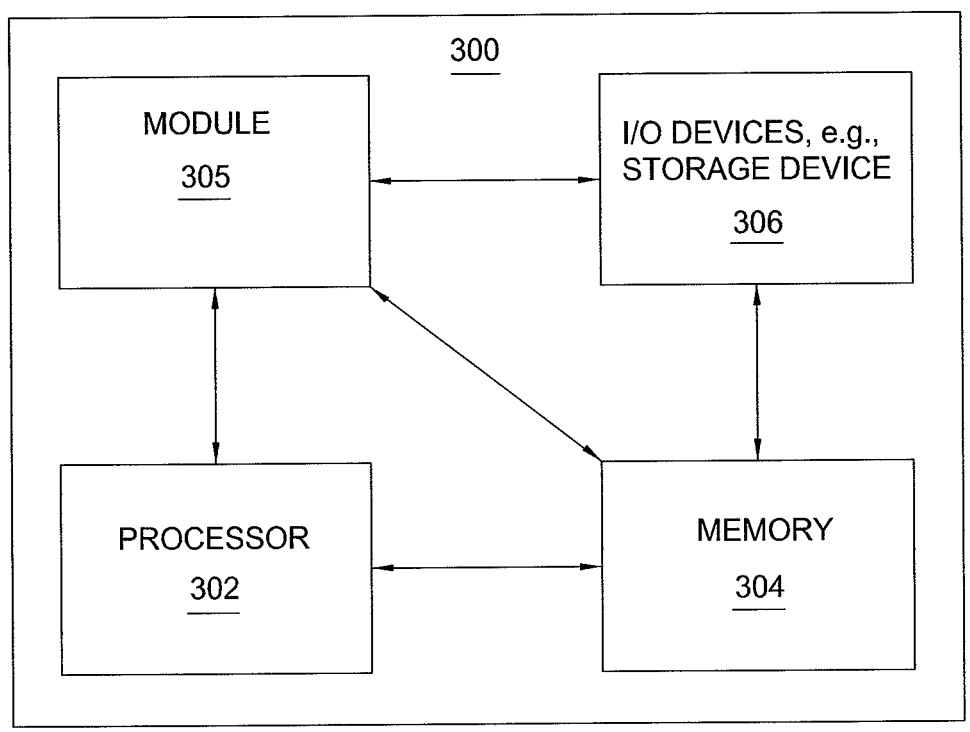
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing mobile social networking privacy, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 305 providing mobile social networking privacy can be loaded into memory 304 and executed by processor 302 to implement the functions as discussed above. As such, the present method 305 providing mobile social networking privacy (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing mobile social networking privacy, comprising:
   receiving, by a processor, a request from a third party application for location information of a mobile endpoint device user;
   determining, by the processor, whether the third party application is a multiple user application; and
   providing, by the processor, the location information of the mobile endpoint device user to the third party application in accordance with a privacy setting that determines whether the third party application is authorized to access the location information of the mobile endpoint device user that is pre-defined by an authorized user if the third party application is a multiple user application, wherein the authorized user is someone other than the mobile endpoint device user, wherein the multiple user application comprises an application that allows a user other than the mobile endpoint device user to use the location information associated with the mobile endpoint device user.

2. The method of claim 1, wherein the determining further comprises:
   authenticating the third party application; and
   determining if the mobile endpoint device user is subscribed to a service to provide the location information.

3. The method of claim 1, wherein the authorized user is an account holder.

4. The method of claim 1, wherein the authorized user is a person delegated as the authorized user by an account holder.

5. The method of claim 1, wherein the location information of the mobile endpoint device user is provided within a pre-defined range.

6. The method of claim 1, wherein the location information of the mobile endpoint device user is determined via a cellular identification.

7. The method of claim 1, wherein the location information of the mobile endpoint device user is determined via an enhanced cell identification.

8. The method of claim 1, wherein the location information of the mobile endpoint device user is determined via an assisted global positioning satellite information.

9. A non-transitory computer-readable medium storing a plurality of instructions which, when executed by a processor, cause the processor to perform operations for providing mobile social networking privacy, the operations comprising:
   receiving a request from a third party application for location information of a mobile endpoint device user;
   determining whether the third party application is a multiple user application; and
   providing the location information of the mobile endpoint device user to the third party application in accordance with a privacy setting that determines whether the third party application is authorized to access the location information of the mobile endpoint device user that is pre-defined by an authorized user if the third party application is a multiple user application, wherein the authorized user is someone other than the mobile endpoint device user, wherein the multiple user application comprises an application that allows a user other than the mobile endpoint device user to use the location information associated with the mobile endpoint device user.

10. The non-transitory computer-readable medium of claim 9, wherein determining further comprises:
    authenticating the third party application; and
    determining if the mobile endpoint device user is subscribed to a service to provide the location information.

11. The non-transitory computer-readable medium of claim 9, wherein the authorized user is an account holder.

12. The non-transitory computer-readable medium of claim 9, wherein the authorized user is a person delegated as the authorized user by an account holder.

13. The non-transitory computer-readable medium of claim 9, wherein the location information of the mobile endpoint device user is provided within a pre-defined range.

14. The non-transitory computer-readable medium of claim 9, wherein the location information of the mobile endpoint device user is determined via a cellular identification.

15. The non-transitory computer readable medium of claim 9, wherein the location information of the mobile endpoint device user is determined via an enhanced cell identification.

16. An apparatus for providing mobile social networking privacy, comprising:

a processor; and a computer-readable medium storing a plurality of instructions which, when executed by the processor, cause the processor to perform operations, the operations comprising:

receiving a request from a third party application for location information of a mobile endpoint device user;

determining whether the third party application is a multiple user application; and providing the location information of the mobile endpoint device user to the third party application in accordance with a privacy setting that determines whether the third party application is authorized to access the location information of the mobile endpoint device user that is pre-defined by an authorized user if the third party application is a multiple user application, wherein the authorized user is someone other than the mobile endpoint device user, wherein the multiple user application comprises an application that allows a user other than the mobile endpoint device user to use the location information associated with the mobile endpoint device user.

17. The apparatus of claim 16, wherein the determining further comprises:

authenticating the third party application; and determining if the mobile endpoint device user is subscribed to a service to provide the location information.

18. The apparatus of claim 16, wherein the authorized user is an account holder.

19. The apparatus of claim 16, wherein the authorized user is a person delegated as the authorized user by an account holder.

20. The apparatus of claim 16, wherein the location information of the mobile endpoint device user is provided within a pre-defined range.

\* \* \* \* \*